United States Patent [19]

Otterson

[11] 4,372,569
[45] Feb. 8, 1983

[54] SINGLE WHEEL TRAILER SUPPORT

[76] Inventor: Robert C. Otterson, 11185 S.W. Foothill Dr., Portland, Oreg. 97225

[21] Appl. No.: 176,465

[22] Filed: Aug. 8, 1980

[51] Int. Cl.³ .............................................. B62D 61/00
[52] U.S. Cl. .......................................... 280/78; 16/44
[58] Field of Search ................. 280/460 R, 78, 79, 84, 280/724, 725, 726; 16/44

[56] References Cited

U.S. PATENT DOCUMENTS

| | | | |
|---|---|---|---|
| 1,048,951 | 12/1912 | Edwards | 16/44 |
| 1,794,630 | 3/1931 | Linn | 280/78 |
| 2,470,978 | 5/1949 | Du Brie | 280/78 |
| 2,564,996 | 8/1951 | Rasbach | 280/78 |
| 3,286,298 | 11/1966 | Veary et al. | 16/44 |

FOREIGN PATENT DOCUMENTS

| | | | |
|---|---|---|---|
| 931872 | 8/1955 | Fed. Rep. of Germany | 280/724 |
| 1112584 | 3/1956 | France | 16/44 |
| 403,504 | 6/1966 | Switzerland | 16/44 |

Primary Examiner—Joseph F. Peters, Jr.
Assistant Examiner—Ross Weaver
Attorney, Agent, or Firm—Kolisch, Hartwell & Dickinson

[57] ABSTRACT

A single wheel support for a vehicle-towed trailer. The support includes a swivel plate mounted on the trailer for swiveling about an upright axis. An elongate arm assembly is mounted adjacent one of its ends on the swivel plate for swinging about a horizontal swing axis. The wheel in the support is rotatably mounted on the other end of the assembly rearwardly of the swing axis. The arm assembly is biased in a direction opposing the weight of the trailer by a coiled spring compressibly interposed between the plate and a back region of the arm assembly, and by a coiled spring under tension interposed between the plate and a front region of the assembly.

5 Claims, 3 Drawing Figures

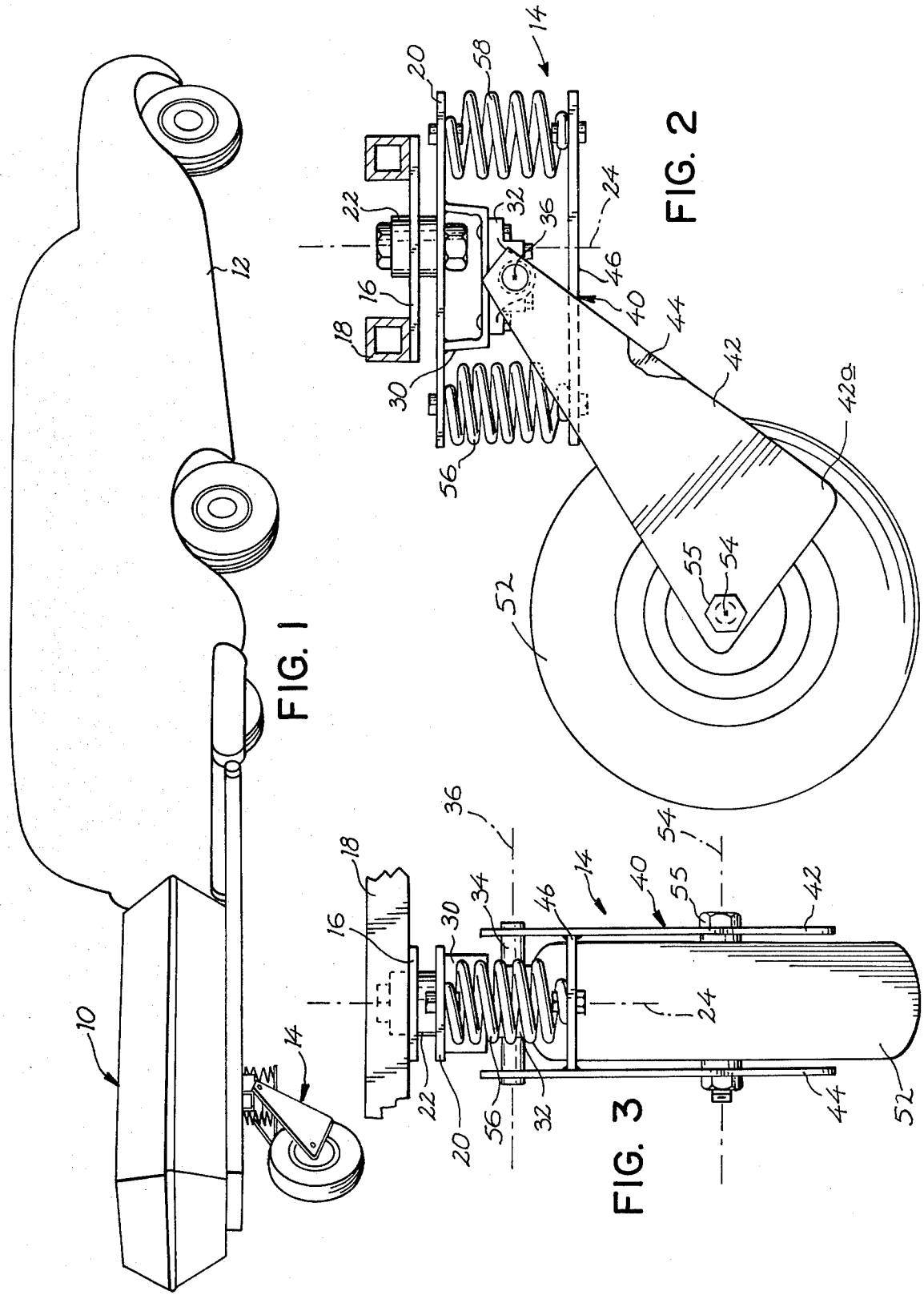

4,372,569

SINGLE WHEEL TRAILER SUPPORT

BACKGROUND AND SUMMARY

The present invention relates to wheel supports for trailers, and in particular, to a support having a single wheel and a swiveled mounting.

In lightweight trailers, such as might be pulled by small vehicles, it is desirable to reduce trailer weight and expense by using a swiveled single wheel as the trailer support. Problems have arisen with conventional single wheel trailers since there tends to be bouncing and swaying in the trailer as the trailer is drawn along the highway, and this movement is transmitted to the vehicle towing the trailer. One particular problem which has been noted is that, with the vehicle and trailer traveling around a curve, the trailer wheel may leave the ground surface upon hitting a bump or other obstruction in the road, returning to the ground surface at a somewhat different angle with respect to the trailer, thus producing considerable swaying. This problem is particularly noticeable in a trailer where the wheel is biased to occupy a plane extending longitudinally of the trailer, and thus tends to orient in this position on moving out of ground contour.

It is a general object of the present invention to provide for use in a small vehicle-towed trailer, a single wheel support which substantially overcomes above-noted problems known in the prior art.

Another object of the invention is to provide such a support which acts to reduce bouncing in the trailer during trailer travel.

Still another object of the invention is to provide such a support which is freely swivelable with respect to the trailer which it supports.

Yet another object of the invention is to provide such a support having a pair of suspension springs arranged in tandem, with each spring capable of providing adequate trailer suspension in case of breakage of the other.

In a preferred embodiment of the invention, the two springs are compressed and extended coiled springs disposed on opposite sides of a pivot means pivotally mounting upper extremeties of depending wheel-supporting arms.

These and other objects and features of the present invention will become more fully apparent when the following detailed description of a preferred embodiment of the invention is read in connection with the accompanying drawings, wherein:

FIG. 1 is a perspective, somewhat simplified view of a vehicle-towed trailer constructed according to the present invention;

FIG. 2 is a side view of a trailer support in the trailer showing in cross section a pair of frame members to which the support is attached; and FIG. 3 is a rear view of the support, as viewed from the left in FIG. 2.

DETAILED DESCRIPTION OF A PREFERRED EMBODIMENT OF THE INVENTION

Viewing FIG. 1, there is shown at 10 a trailer which is conventionally hitched to a vehicle 12 for towing. Trailer 10 is supported by a swivelable, single-wheel trailer support 14 constructed according to the present invention.

Referring to FIGS. 2 and 3, support 14 includes a mounting plate 16 which is secured, as by bolting or welding, to a pair of frame members or beams, such as beams 18 forming part of the frame of the trailer. Under normal towing conditions, plate 16 is substantially horizontally disposed. An elongate swivel member, or plate, 20 is mounted on plate 16 by a bearing means 22 which accomodates swivel movement of plate 20 about an upright swivel axis 24.

A U-shaped bracket 30 welded to the bottom of plate 20 intermediate the ends of the plate has means 32 (FIG. 2) bolted against its lower surface rotatably supporting a shaft 34 (FIG. 3). The shaft is rotatable about its longitudinal axis which is horizontal, and indicated at 36 in the drawings.

An arm assembly 40 is mounted on shaft 34 for swinging about axis 36. Assembly 40 includes a pair of elongate, spaced apart wheel-supporting arms 42, 44 which are joined to shaft 34. The two arms have an increasing width on progressing downwardly and away from shaft 34, as seen in FIG. 2. Also included in assembly 40 is a tilt member, or plate 46, referred to herein also as a spring-mounting member, which is carried between plates 42, 44 and which is attached to the two plates, as by welding. Under normal load conditions, plate 46 is disposed substantially parallel to plate 20. Front and rear end regions of the plate are disposed on opposite sides, i.e., to the front and to the rear, of axis 36.

A single wheel 52, which may include the usual inflatable tire, is rotatably mounted adjacent the end of assembly 40 which is opposite the end joined to shaft 34. The mounting for the wheel which includes fasteners, such as fastener 55, accommodates rotation of the wheel about a horizontal axis 54 which parallels axis 36.

As earlier discussed, arms 42, 44 have increasing width progressing downwardly from shaft 34. Thus the arms have an expanse as exemplified by expense 42a of arm 42 which are forwardly of and below the rotation axis of the wheel. As a consequence, a fending action is provided which assists the trailer wheel in traveling over extremely rough terrain.

Suspension in support 14 is provided by a pair of tandemly arranged springs 56, 58 interposed between plates 20, 46. Spring 56 is bolted, at its upper and lower ends in FIG. 2, to rear end regions of plates 20, 46, respectively. Spring 58 is bolted, at its upper and lower ends in this figure, to front end regions of plates 20, 46, respectively. Springs 56, 58 are coiled suspension springs having preferred relaxed lengths of about six inches and five inches, respectively.

With support 14 in an operative condition, that is, with the weight of the trailer being supported by the support, assembly 40 is shifted to a position like that shown in FIG. 2, where springs 56, 58 are compressed and extended, respectively. In such condition, each spring biases assembly 40 in a direction opposing the weight of the trailer applied to the support, i.e., in a counterclockwise direction in FIG. 2. Springs 56, 58 are also referred to herein as compression spring means and tension spring means, respectively.

Operation of the present invention will now be described. When the forwardly moving support wheel encounters an obstruction in the road, arm assembly 14 is moved initially in a clockwise direction with respect to the trailer in FIG. 2. This movement is opposed by further compression and extension in springs 56, 58, respectively. As the two springs recoil, the assembly swings in the opposite direction, in effect, producing an unweighting of the trailer. Here both springs are acting in a direction which urges the wheel toward the road surface, to keep the tire in the support pressed firmly against the road. This reduces the tendency of the support wheel to swivel away from the direction of vehicle movement when a road obstruction is encountered.

Another important function performed by the two tandemly-arranged springs in support 14 is dampening vertical oscillation in the support. In a trailer support having a single suspension spring, the support tends to oscillate at a natural harmonic mode in the spring. Thus large oscillations, which can occur on encountering a road obstruction, may be damped very slowly. In the present invention, springs 56, 58, having different lengths, oscillate at different harmonic modes, whereby the motion produced in one spring quickly interferes with and cancels the motion produced in the other.

When the towing vehicle executes a turn, the support wheel tends to shift relative to the trailer through swiveling of plate 20 about axis 24. The swiveling is unaffected by springs 56, 58 since the two springs are included in that portion of the support which swivels freely about axis 24. This construction is in contrast to trailer supports in which a suspension spring is interposed between the trailer frame and the wheel, and thus acts to keep the support wheel oriented in a straight-like direction.

While a specific embodiment of the present invention has been disclosed herein, it is apparent that various changes and modifications may be made without departing from the spirit of the invention.

It is claimed and desired to secure as Letters Patent:

1. Single wheel apparatus for supporting a vehicle-towed trailer, said apparatus comprising:
   an elongate substantially horizontal swivel member and swivel means for mounting the swivel member on the trailer for swiveling of the member about an upright axis,
   an elongate arm assembly and pivot means mounting the assembly adjacent its upper end on said swivel member, at a region intermediate the ends of the swivel member, for swinging of the arm assembly about a horizontal swing axis, the assembly including at least one elongate arm depending downwardly from said pivot means, said arm assembly further including an elongate spring-mounting member disposed under and spaced from the swivel member and joined to said arm between its ends, said swivel and spring-mounting members extending longitudinally in the trailer and having opposite end regions disposed forwardly and rearwardly of said swing axis,
   a wheel mounted on said assembly adjacent the lower end thereof for rotation about a rotation axis substantially paralleling said swing axis and disposed rearwardly of said swivel axis,
   compression spring means interposed between said swivel member and said spring-mounting member, located rearwardly of said swing axis, operable to urge said assembly in one direction about said swing axis, and
   tension spring means interposed between said swivel member and said spring-mounting member, located forwardly of said swing axis, operable to urge said assembly in said one direction about said swing axis.

2. The apparatus of claim 1, wherein said compression spring means and said tension spring means comprise coiled springs which in operative condition, are compressed and extended, respectively.

3. The apparatus of claim 1, wherein said assembly includes a pair of parallel arms disposed on opposite sides of said wheel, said arms including fender portions located forwardly and below the wheel's rotation axis.

4. A trailer comprising
   a trailer frame, and
   a single wheel apparatus supporting the trailer for movement over the ground, said apparatus comprising
   an elongate, substantially horizontal swivel member extending longitudinally in the trailer and swivel means mounting the swivel member intermediate its ends on the underside of the trailer frame accommodating swiveling of the member about an upright swivel axis,
   an elongate arm assembly and pivot means mounting the assembly adjacent one of its ends on said swivel member, at a region intermediate the ends of the swivel member, for swinging about a horizontal swing axis, said arm assembly including a pair of downwardly extending, opposed and spaced apart wheelsupporting arms and a spring-mounting member located between the arms joined to at least one of the arms disposed under and spaced from said swivel member and with opposite ends located forwardly and rearwardly of said swing axis,
   an upright compression spring means located rearwardly of said swing axis interposed in a state of compression between said spring-mounting member and said swivel member,
   an upright tension spring means located forwardly of said swing axis interposed in a state of tension between said swivel member and spring-mounting member, and
   a trailer wheel disposed between said opposed arms of the arm assembly under and rearwardly of the spring-mounting member so as to clear the member, and rotatably mounted on said arms for rotation about a rotation axis paralleling and disposed rearwardly of said swing axis.

5. The trailer of claim 4, wherein said wheel-supporting arms include expanses located forwardly of and spaced below said rotation axis.

* * * * *